United States Patent
Kang et al.

(10) Patent No.: US 10,295,859 B2
(45) Date of Patent: May 21, 2019

(54) LIQUID CRYSTAL DISPLAY DEVICE

(71) Applicant: Samsung Display Co., Ltd., Yongin, Gyeonggi-do (KR)

(72) Inventors: Eui Jeong Kang, Suwon-si (KR); Seok Hyun Nam, Seoul (KR); Ju Hwa Ha, Asan-si (KR); Sang Ho Hwang, Suwon-si (KR)

(73) Assignee: Samsung Display Co., Ltd. (KR)

( * ) Notice: Subject to any disclaimer, the term of this patent is extended or adjusted under 35 U.S.C. 154(b) by 4 days.

(21) Appl. No.: 14/821,639

(22) Filed: Aug. 7, 2015

(65) Prior Publication Data

US 2016/0223862 A1 Aug. 4, 2016

(30) Foreign Application Priority Data

Feb. 2, 2015 (KR) ........................ 10-2015-0016226

(51) Int. Cl.
*F21V 8/00* (2006.01)
*G02F 1/1333* (2006.01)
*G02F 1/1335* (2006.01)

(52) U.S. Cl.
CPC ..... *G02F 1/133524* (2013.01); *G02B 6/0025* (2013.01); *G02B 6/0031* (2013.01); *G02F 1/133308* (2013.01); *G02B 6/0036* (2013.01); *G02B 6/0046* (2013.01); *G02B 6/0055* (2013.01); *G02B 6/0088* (2013.01); *G02F 1/133615* (2013.01)

(58) Field of Classification Search
CPC ......... G02F 1/133524; G02F 1/133308; G02F 1/133615; G02F 1/133608; G02B 6/0031; G02B 6/0036; G02B 6/0046; G02B 6/0055; G02B 6/0088
See application file for complete search history.

(56) References Cited

U.S. PATENT DOCUMENTS

| 2010/0124075 A1* | 5/2010 | Ye .............................. C08J 5/18 362/606 |
| 2010/0165232 A1* | 7/2010 | Park ..................... G02B 6/0051 349/58 |

(Continued)

FOREIGN PATENT DOCUMENTS

| JP | 2010-176872 | 8/2010 |
| JP | 2012-150429 | 8/2012 |

(Continued)

OTHER PUBLICATIONS 15196196.8. EP Search Report, dated Jul. 11, 2016, 10 pages.

*Primary Examiner* — Nathanael R Briggs
(74) *Attorney, Agent, or Firm* — Innovation Counsel LLP

(57) ABSTRACT

Disclosed herein is a liquid crystal display device having a thin thickness and a reduced size of a bezel. According to an exemplary embodiment, the liquid crystal display device includes: a liquid crystal display panel including a display area and a non-display area enclosing the display area; a light guide plate disposed under the liquid crystal display panel and having a polygonal plane shape including a first side, a second side, a third side, and a fourth side; and a light source adjacent to the first side of the light guide plate, wherein at least one of the second side, the third side, and the fourth side of the light guide plate overlaps the display area.

32 Claims, 14 Drawing Sheets

(56) References Cited

U.S. PATENT DOCUMENTS

| | | |
|---|---|---|
| 2010/0321421 A1* | 12/2010 | Kee .................... G09G 3/3426 |
| | | 345/697 |
| 2012/0069261 A1 | 3/2012 | Lee et al. |
| 2012/0140447 A1* | 6/2012 | Yamamoto ........... G02B 6/0021 |
| | | 362/97.2 |
| 2013/0039036 A1* | 2/2013 | Son ..................... G02F 1/1336 |
| | | 362/97.1 |
| 2014/0085569 A1 | 3/2014 | Choi et al. |
| 2015/0009712 A1 | 1/2015 | Hwang et al. |
| 2016/0048051 A1* | 2/2016 | Chen ..................... A47B 81/06 |
| | | 349/58 |

FOREIGN PATENT DOCUMENTS

| | | |
|---|---|---|
| KR | 1020010043176 A | 5/2001 |
| KR | 1020120122654 A | 11/2012 |
| KR | 1020130017477 A | 2/2013 |

\* cited by examiner

LIQUID CRYSTAL DISPLAY DEVICE

CROSS-REFERENCE TO RELATED APPLICATION

This application claims priority to and the benefit of Korean Patent Application No. 10-2015-0016226 filed in the Korean Intellectual Property Office on Feb. 2, 2015, the entire contents of which are incorporated herein by reference.

BACKGROUND (a) Technical Field

The present application relates to a liquid crystal display device, and more particularly, to a liquid crystal display device having a thin thickness and a reduced size of a bezel.

(b) Description of the Related Art

A computer monitor, a television, a mobile phone, and the like, which has been widely used today, require a display device. An example of the display device may include a cathode ray tube display device, a liquid crystal display device, a plasma display device, and the like.

A liquid crystal display device is one of the flat panel display devices which have been most widely used currently and includes two sheets of display panels in which field generating electrodes, such as a pixel electrode and a common electrode, are formed and a liquid crystal layer interposed therebetween. A voltage is applied to the field generating electrodes to generate an electric field in the liquid crystal layer and determines an alignment of liquid crystal molecules of the liquid crystal layer and controls a polarization of incident light by the generated electric field, thereby displaying an image.

The liquid crystal display device does not emit light itself and therefore needs to have a light source. In this case, the light source may be an artificial light source which is separately provided or natural light. Here, the artificial light source needs a light guide plate (LGP) by which the emitted light may reach the entire display panel with uniform luminance.

The light emitted from the light source is incident on a side surface of the light guide plate and is emitted to an upper surface and then reaches a liquid crystal display panel. The liquid crystal display panel is configured of a display area and a non-display area. In this case, it is suitable to dispose the light guide plate to enable light to reach the entire display area. For this purpose, a size of the light guide plate is generally designed to be larger than the display area.

Recently, technologies for reducing a thickness of the liquid crystal display device and a size of a bezel have been developed. However, there is a limitation in reducing the thickness of the liquid crystal display device and the size of the bezel due to the light guide plate.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a liquid crystal display device having a thin thickness and a reduced size of a bezel.

An exemplary embodiment provides a liquid crystal display device including: a liquid crystal display panel including a display area and a non-display area enclosing the display area; a light guide plate disposed under the liquid crystal display panel and having a polygonal plane shape including a first side, a second side, a third side, and a fourth side; and a light source adjacent to the first side of the light guide plate, wherein at least one of the second side, the third side, and the fourth side of the light guide plate overlaps the display area.

The first side of the light guide plate may overlap the non-display area and the second side, the third side, and the fourth side of the light guide plate may overlap the display area.

The liquid crystal display device may further include: a lower cover receiving the liquid crystal display panel, the light guide plate, and the light source, wherein the lower cover includes: a first bottom surface; a second bottom surface enclosing the first bottom surface and having a depth shallower than that of the first bottom surface; an inclined surface and a first side surface connecting between the first bottom surface and the second bottom surface; and a second side surface connected to the second bottom surface to enclose the second bottom surface, the inclined surface is positioned outside the second side, the third side, and the fourth side of the light guide plate, and the first side surface of the lower cover is positioned outside the first side of the light guide plate.

The light guide plate may have a rectangular shape and a length of the first side and the second side may be longer than that of the third side and the fourth side.

The liquid crystal display device may further include: a first reflective sheet positioned on the inclined surface.

The first reflective sheet may be configured of a specular reflective sheet.

The first reflective sheet may be configured of a diffuse reflective sheet on which a pattern is printed.

As the pattern is farther away from the light guide plate, a size of the pattern may be increased.

The liquid crystal display device may further include: a prism attached to side surfaces of the second side, the third side, and the fourth side of the light guide plate.

The side surfaces of the second side, the third side, and the fourth side of the light guide plate may have a reverse taper shape.

The liquid crystal display device may further include: a light blocking member positioned under the second side, the third side, and the fourth side of the light guide plate.

The light blocking member may be attached to a portion of the lower cover at which the first bottom surface and the inclined surface are connected.

The light source may be attached to the first side surface of the lower cover.

A light emitting direction of the light source may direct to the first side of the light guide plate.

The first side of the light guide plate and the second side facing the first side may overlap the non-display area and the third side and the fourth side of the light guide plate may overlap the display area.

The liquid crystal display device may further include: a lower cover receiving the liquid crystal display panel, the light guide plate, and the light source, wherein the lower cover includes: a first bottom surface; a second bottom surface enclosing the first bottom surface and having a depth shallower than that of the first bottom surface; an inclined surface and a first side surface connecting the first bottom surface to the second bottom surface; and a second side surface connected to the second bottom surface to enclose the second bottom surface, the inclined surface overlaps the second side of the light guide plate and is positioned outside the third side and the fourth side of the light guide plate, and the first side surface of the lower cover is positioned outside the first side of the light guide plate.

The side surface of the second side of the light guide plate may have an inclination.

The inclination of the side surface of the second side of the light guide plate may be parallel with an inclination of the inclined surface of the lower cover.

The liquid crystal display device may further include: a first reflective sheet positioned on the inclined surface which is adjacent to the third side and the fourth side of the light guide plate; and a second reflective sheet positioned between the light guide plate and the lower cover.

The first reflective sheet may be configured of a specular reflective sheet or a diffuse reflective sheet on which a pattern is printed.

The first reflective sheet may be configured of a diffuse reflective sheet.

The liquid crystal display device may further include: a prism attached to side surfaces of the third side and the fourth side of the light guide plate.

The thickness of the light guide plate may be gradually thinner from the first side toward the second side.

The second side facing the first side of the light guide plate may overlap the display area and the first side, the third side, and the fourth side of the light guide plate may overlap the non-display area.

The liquid crystal display device may further include: a lower cover receiving the liquid crystal display panel, the light guide plate, and the light source, wherein the lower cover includes: a first bottom surface; a second bottom surface enclosing the first bottom surface and having a depth shallower than that of the first bottom surface; an inclined surface and a first side surface connecting between the first bottom surface and the second bottom surface; and a second side surface connected to the second bottom surface to enclose the second bottom surface, the inclined surface overlaps the third side and the fourth side of the light guide plate and is positioned outside the second side, and the first side surface of the lower cover is positioned outside the first side of the light guide plate.

The side surfaces of the third side and the fourth side of the light guide plate may have an inclination.

The inclination of the side surfaces of the third side and the fourth side of the light guide plate may be parallel with an inclination of the inclined surface of the lower cover.

The liquid crystal display device may further include: a first reflective sheet positioned on the inclined surface which is adjacent to the second side of the light guide plate; and a second reflective sheet positioned between the light guide plate and the lower cover.

The first reflective sheet may be configured of a specular reflective sheet or a diffuse reflective sheet on which a pattern is printed.

The second reflective sheet may be configured of a diffuse reflective sheet.

The liquid crystal display device may further include: a prism attached to a side surface of the second side of the light guide plate.

The thickness of the light guide plate may be gradually thinner from a center toward the third side and the fourth side.

The liquid crystal display device according to the exemplary embodiment as described above has the following effects.

According to an exemplary embodiment, it is possible to provide the liquid crystal display device having the thin thickness and the reduced size of the bezel by reducing the size or thickness of the light guide plate.

DETAILED DESCRIPTION OF THE EMBODIMENTS

Figure 1:
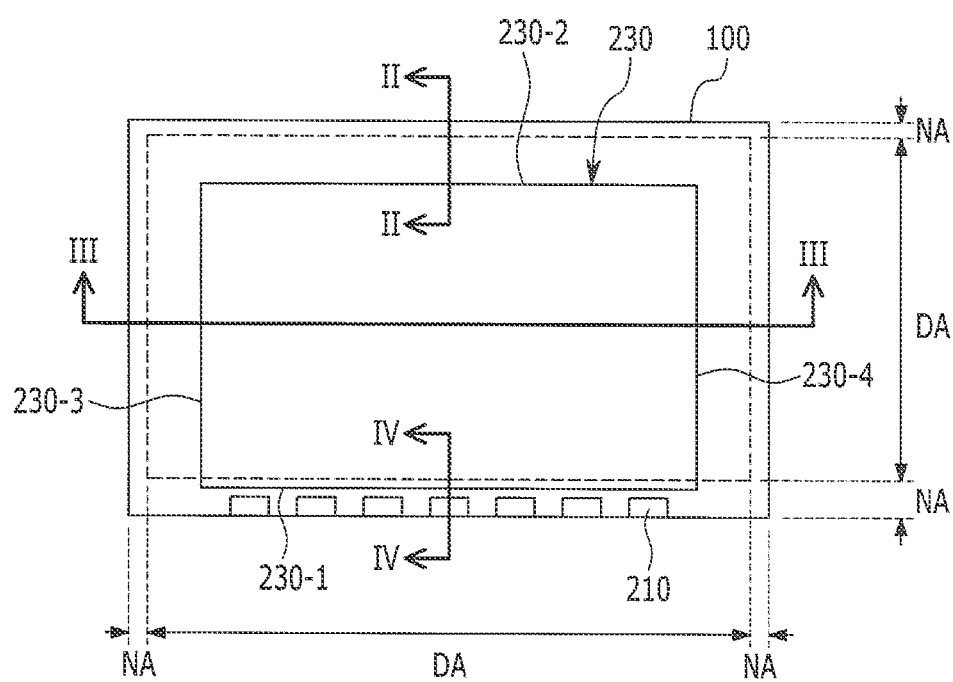
FIG. 1 is a plan view of a liquid crystal display device according to an exemplary embodiment.

Hereinafter, the inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display device according to an exemplary embodiment will be described with reference to FIG. 1 to 4.

Figure 2:
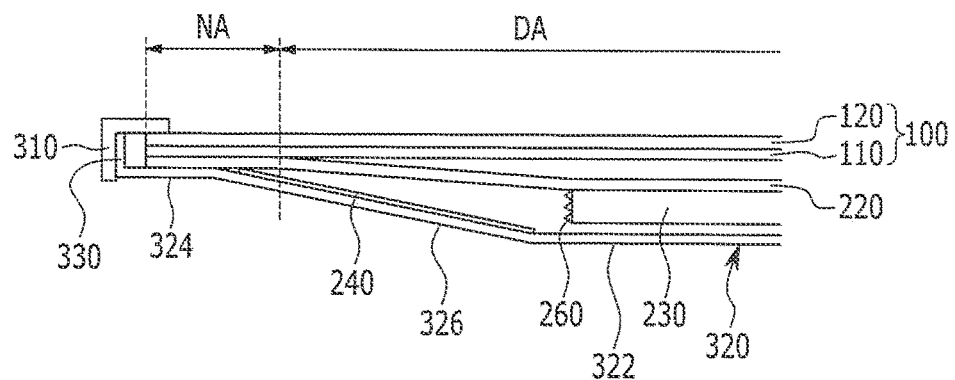
FIG. 2 is a cross-sectional view of the liquid crystal display device according to the exemplary embodiment taken along the line II-II of FIG. 1.
Figure 3:
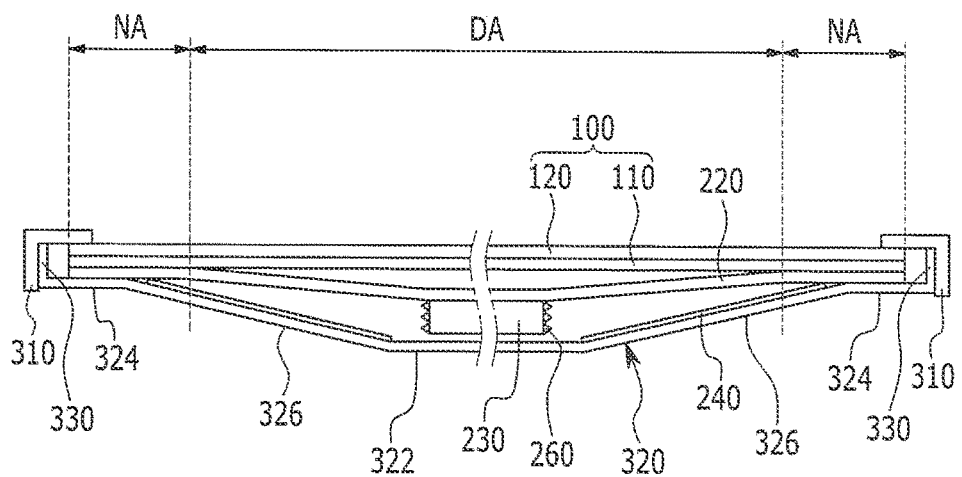
FIG. 3 is a cross-sectional view of the liquid crystal display device according to the exemplary embodiment taken along the line III-III of FIG. 1.
Figure 4:
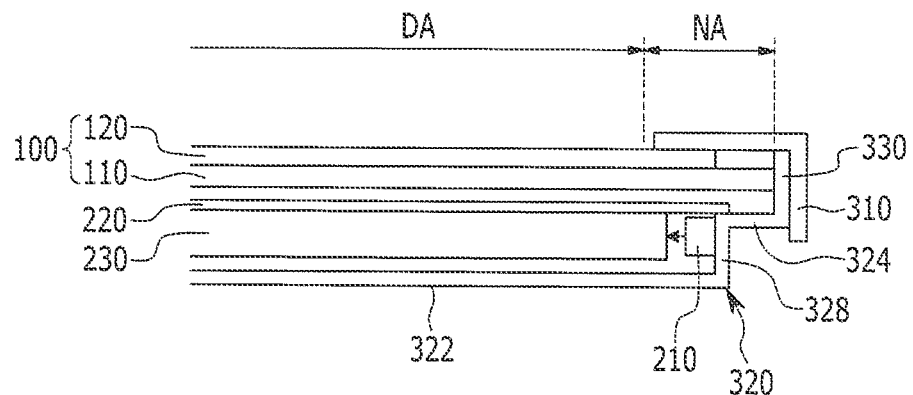
FIG. 4 is a cross-sectional view of the liquid crystal display device according to the exemplary embodiment taken along the line IV-IV of FIG. 1.

FIG. 1 is a plan view of a liquid crystal display device according to an exemplary embodiment. FIG. 2 is a cross-sectional view of the liquid crystal display device according to the exemplary embodiment taken along the line II-II of FIG. 1. FIG. 3 is a cross-sectional view of the liquid crystal display device according to the exemplary embodiment taken along the line III-III of FIG. 1. FIG. 4 is a cross-sectional view of the liquid crystal display device according to the exemplary embodiment taken along the line IV-IV of FIG. 1.

An illustrated in FIGS. 1 to 4, the liquid crystal display device according to the exemplary embodiment includes a liquid crystal display panel 100, a light guide plate 230 positioned under the liquid crystal display panel 100, and a light source 210 positioned at one edge of the light guide plate 230.

The liquid crystal display panel 100 includes a display area DA and a non-display area NA enclosing the display area DA. The display area DA is an area displaying a screen and the non-display area NA is a covered area. A circuit part, a dummy pixel, and the like may be positioned in the non-display area NA. The non-display area NA is an area which is required to drive the liquid crystal display or a portion at which the screen is not displayed, and therefore the exemplary embodiment is to minimize the non-display area NA.

The liquid crystal display panel 100 includes a first substrate 110 and a second substrate 120 which face each other. The first substrate 110 and the second substrate 120 may be made of glass, plastic, or the like. A first field generating electrode (not illustrated) may be formed on the first substrate 110 and the second field generating electrode (not illustrated) may be formed on the second substrate 120. When a predetermined voltage is applied to the two field generating electrodes, respectively, an electric field is formed between the first substrate 110 and the second substrate 120. The two field generating electrodes may also be formed on the same substrate.

Although not illustrated, a liquid crystal layer may be positioned between the first substrate 110 and the second substrate 120. The liquid crystal layer is formed of a plurality of liquid crystal molecules and may be formed of a positive type or a negative type.

Light emitted from the light source 210 passes through the light guide plate 230 and is then supplied to the liquid crystal display panel 100.

A direction of the liquid crystal molecules is determined depending on the electric field formed between the first substrate 110 and the second substrate 120 and a light quantity passing through the liquid crystal layer is changed depending on the direction of the liquid crystal molecules.

For example, all or a portion of the light supplied to the liquid crystal display panel 100 may pass through the liquid crystal display panel 100 and all of the light supplied to the liquid crystal display panel 100 may not pass through the liquid crystal display panel 100. As such, an image may be displayed by controlling the quantity of light supplied to the liquid crystal display panel 100 which passes through the liquid crystal display panel 100 in each pixel.

The light guide plate 230 is positioned under the liquid crystal display panel 100 to supply light to the liquid crystal display panel 100. The light supplied from the light source 210 is incident on a side of the light guide plate 230, emitted to an upper surface of the light guide plate 230, and then incident on a lower surface of the liquid crystal display panel 100.

The light guide plate 230 has a polygonal plane shape which includes a first side 230-1, a second side 230-2, a third side 230-3, and a fourth side 230-4. The plane shape of the light guide plate 230 may have a rectangular shape including two long sides and two short sides. The first side 230-1 and the second side 230-2 which are sides facing each other may correspond to the long side and the third side 230-3 and the fourth side 230-4 which are sides facing each other may correspond to the short side.

The light source 210 is disposed to be adjacent to the first side 230-1 of the light guide plate 230 and the light source 210 is not disposed at the second side 230-2, the third side 230-3, and the fourth side 230-4.

As the light source 210, there may be a light emitting diode (LED), a cold cathode fluorescent lamp (CCFL), an external electrode fluorescent lamp (EEFL), and the like. Among them, the light emitting diode (LED) may have many features such as longer lifespan, a smaller size, and lower power consumption than other light sources, and therefore has been actively used recently.

As illustrated, the light source 210 may be disposed to be adjacent to the first side 230-1 of the light guide plate 230. In this case, the plurality of light sources 210 may be disposed at a predetermined interval from one edge of the first side 230-1 of the light guide plate 230 to the other edge The first side 230-1 of the light guide plate 230 overlaps the non-display area NA of the liquid crystal display panel 100 and the second side 230-2, the third side 230-3, and the fourth side 230-4 of the light guide plate 230 overlap the display area DA of the liquid crystal display panel 100. That is, all the remaining sides other than the first side 230-1 at which the light source 210 is disposed overlap the display area DA of the liquid crystal display panel 100. Therefore, the size of the light guide plate 230 is formed to be smaller than that of the liquid crystal display panel 100. That is, the edge of the liquid crystal display device is not formed with the light guide plate 230, and thus the thickness of the liquid crystal display device may be reduced as much as the thickness of the light guide plate 230. Therefore, the thickness of three sides of the liquid crystal display device may be thin.

The liquid crystal display device further includes a lower cover 320 in which the liquid crystal display panel 100, the light guide plate 230, and the light source 210 are received and an upper cover 310 which covers an upper edge and a side of the liquid crystal display panel 100.

The lower cover 320 and the upper cover 310 may fix the liquid crystal display panel 100, the light guide plate 230, and the light source 210 and may protect them from an external impact.

The lower cover 320 includes a first bottom surface 322, a second bottom surface 324, an inclined surface 326 and a first side surface 328 which connects between the first bottom surface 322 and the second bottom surface 324, and a second side surface 330 enclosing the second bottom surface 324.

The first bottom surface 322 is positioned under the light guide plate 230 and has a plane shape approximately similar to the light guide plate 230.

The second bottom surface 324 encloses the first bottom surface 322 and has a depth shallower than that of the first bottom surface 322.

The light guide plate 230 is received in the first bottom surface 322. The liquid crystal display panel 100 is larger than the light guide plate 230 and is received in the second bottom surface 324 while being positioned on the light guide plate 230.

The inclined surface 326 connects between the first bottom surface 322 and the second bottom surface 324 and is positioned outside the second side 230-2, the third side 230-3, and the fourth side 230-4 of the light guide plate 230. That is, the inclined surface 326 encloses the second side 230-2, the third side 230-3, and the fourth side 230-4 of the light guide plate 230.

The first side surface 328 connects between the first bottom surface 322 and the second bottom surface 324 and is positioned outside the first side 230-1 of the light guide plate 230. That is, the first side surface 328 encloses the first side 230-1 of the light guide plate 230. The light source 210 is fixed to the first side surface 328 of the lower cover 320 and faces the first side 230-1 of the light guide plate 230. Therefore, the light emitted from the light source 210 is incident on the first side 230-1 of the light guide plate 230. That is, the light emitting direction of the light source 210 directs to the first side 230-1 of the light guide plate 230.

The second side surface 330 is connected to the second bottom surface 324 and is positioned outside the liquid crystal display panel 100. That is, the second side surface 330 encloses the side of the liquid crystal display panel 100.

The upper cover 310 covers the edge of the liquid crystal display panel 100, in particular, covers the non-display area NA of the liquid crystal display panel 100. The upper cover 310 covers the side of the lower cover 320, in particular, covers the second side surface 330 of the lower cover 320.

In the liquid crystal display device according to the exemplary embodiment, a portion of the lower cover 320 which is adjacent to the second side 230-2, the third side 230-3, and the fourth side 230-4 of the light guide plate 230 has the inclined surface 326, thereby reducing the thickness of the liquid crystal display device. Therefore, a slim type liquid crystal display device of which the thickness of the edge is thin may be implemented.

The liquid crystal display device according to the exemplary embodiment may further include a first reflective sheet 240 which is positioned on the inclined surface 326 of the lower cover 320.

The first reflective sheet 240 reflects light passing through the second side 230-2, the third side 230-3, and the fourth side 230-4 of the light guide plate 230 and transfers the reflected light to the liquid crystal display panel 100. Therefore, light may be properly transferred to the portion of the liquid crystal display panel 100 which does not overlap the light guide plate 230.

The first reflective sheet 240 may be configured of a specular reflective sheet. For example, the first reflective sheet 240 may be formed of a reflective sheet having high reflectance such as an enhanced specular reflector (ESR). The first reflective sheet 240 has high reflectance and therefore enables most of the light emitted from the side of the light guide plate 230 to be incident on the liquid crystal display panel 100. Therefore, light may reach the edge of the display area DA of the liquid crystal display panel 100.

The first reflective sheet 240 may be configured of the diffuse reflective sheet. In this case, the first reflective sheet 240 is printed with predetermined patterns 242. Hereinafter, the pattern 242 printed on the first reflective sheet 240 will be described with reference to FIG. 5.

Figure 5:
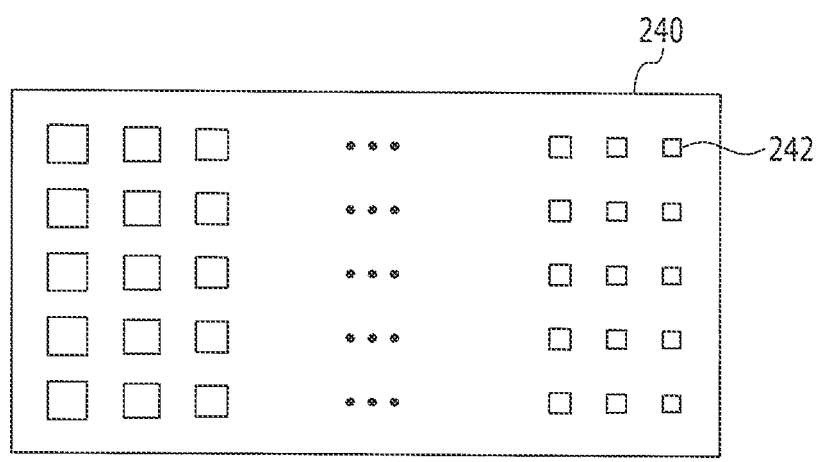
FIG. 5 is a plan view of a first reflective sheet of the liquid crystal display device according to the exemplary embodiment.

FIG. 5 is a plan view of a first reflective sheet 240 of the liquid crystal display device according to the exemplary embodiment.

As the pattern 242 is farther away from the light guide plate 230, a size of the pattern 242 printed on the first reflective sheet 240 is increased. Further, the pattern 242 may be disposed in a matrix form and sizes of the patterns 242 which are disposed in the same column may be same. The size of the pattern 242 which is positioned in the nearest column from the light guide plate 230 is smallest and the size of the pattern 242 which is positioned in the farthest column from the light guide plate 230 is largest. The number of patterns which are disposed in one column may be constant. Therefore, as the pattern 242 is farther away from the light guide plate 230, a density of the patterns 242 is increased.

The higher the density of the patterns 242, the higher the reflectance. A light quantity which reaches a position far away from the light guide plate 230 is relatively smaller than that which reaches a closer position from the light guide plate 230, and as a result, as the pattern 242 is farther away from the light guide plate 230, the density of the pattern 242 is increased, thereby increasing the reflectance. Therefore, light may properly reach the edge of the display area DA of the liquid crystal display panel 100.

According to the exemplary embodiment, the size of the pattern 242 is controlled to control the density of the patterns 242, but the embodiments are not limited thereto. In another embodiment, the size of the pattern 242 is constant and as the pattern 242 is farther away from the light guide plate 230, the number of patterns 242 may be increased. Further, the size and number of patterns 242 may simultaneously be controlled to control the density of the patterns 242.

Referring again to FIGS. 1 to 4, the liquid crystal display device according to the exemplary embodiment may further include a prism 260 which is positioned on one or more of the sides of the light guide plate 230.

The prism 260 is attached to the second side 230-2, the third side 230-3, and the fourth side 230-4 of the light guide plate 230. The prism 260 is formed in a form in which a triangular protrusion is disposed in plural and is attached to the light guide plate 230 by an adhesive member such as a tape. The prism 260 may be made of materials such as silicone.

The prism 260 collects light emitted from the second side 230-2, the third side 230-3, and the fourth side 230-4 of the light guide plate 230, thereby minimizing a light loss. The light passing through the prism 260 is reflected from the first reflective sheet 240 and is then supplied to the liquid crystal display panel 100.

Hereinafter, a path of the light emitted from the side of the light guide plate will be described with reference to FIGS. 6 to 8.

Figure 6:
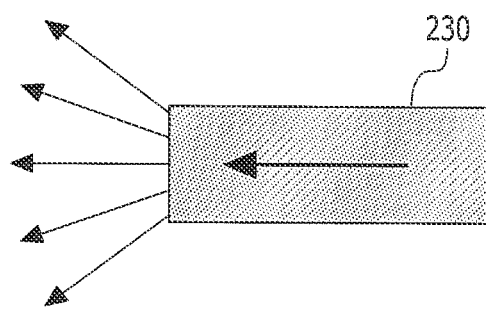
FIG. 6 is a cross-sectional view of a light guide plate of the liquid crystal display device according to the exemplary embodiment.

FIG. 6 is a cross-sectional view of a light guide plate of the liquid crystal display device according to the exemplary embodiment. FIG. 7 is a cross-sectional view of the light guide plate and a prism of the liquid crystal display device according to the exemplary embodiment. FIG. 8 is a cross-sectional view of the light guide plate, the prism, and the first reflective sheet of the liquid crystal display device according to the exemplary embodiment.

Referring to FIG. 6, the light emitted from the side of the light guide plate 230 of the liquid crystal display device is refracted from the side of the light guide plate 230 and is generally diffused in several directions.

Figure 7:
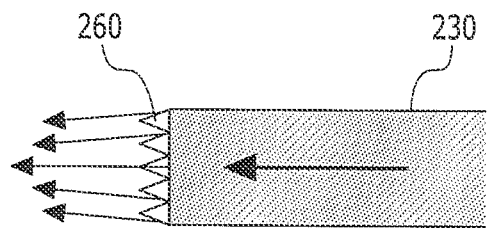
FIG. 7 is a cross-sectional view of the light guide plate and a prism of the liquid crystal display device according to the exemplary embodiment.

Referring to FIG. 7, a prism 260 is attached on the side of the light guide plate 230 of the liquid crystal display device according to the exemplary embodiment. The prism 260 may collect an incident light to one point. Thus, the light emitted from the side of the light guide plate 230 is collected by the prism 260.

Figure 8:
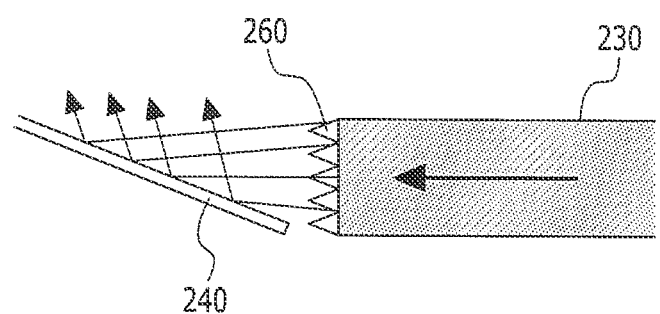
FIG. 8 is a cross-sectional view of the light guide plate, the prism, and the first reflective sheet of the liquid crystal display device according to the exemplary embodiment.

Referring to FIG. 8, the light passing through the prism 260 of the liquid crystal display device according to the exemplary embodiment reaches the first reflective sheet 240. Most of the light reaching the first reflective sheet 240 is reflected and then supplied to the liquid crystal display panel 100.

According to the exemplary embodiment, the light emitted from the side of the light guide plate 230 is not dispersed by the prism 260 and is concentrated on one side, thereby reducing the lost light quantity. Therefore, most of the light emitted from the side of the light guide plate 230 may reach the first reflective sheet 240. Further, most of the light passing through the prism 260 is reflected from the first reflective sheet 240 and supplied to the liquid crystal display panel 100, thereby reducing the lost light quantity. Therefore, the liquid crystal display panel 100 is sufficiently supplied with light even in a region which does not overlap the light guide plate 230, thereby displaying an image.

As described above, the edge of the liquid crystal display device may not be provided with the light guide plate 230 to make the thickness of the edge of the liquid crystal display thin. Further, light is supplied even to a region in which the light guide plate 230 is not formed by the prism 260 and the first reflective sheet 240, thereby minimizing the non-display area NA and reducing a width of the bezel.

Referring again to FIGS. 1 to 4, the liquid crystal display device according to the exemplary embodiment may further include an optical sheet 220 which is positioned between the light guide plate 230 and the liquid crystal display panel 100.

The optical sheet 220 may increase light collection efficiency of light emitted from the light source 210 and make the light have a uniform distribution as a whole. The optical sheet 220 may be formed of a plurality of various sheets, for example, a diffuse sheet, a prism sheet, and a protecting sheet which are sequentially stacked.

The diffuse sheet diffuses the light emitted from the light source 210. The prism sheet collects light diffused from the diffuse sheet in a vertical direction to the plane of the liquid crystal display panel 100. Most of the light passing through the prism sheet is vertically incident on the liquid crystal display panel 100. Further, the protecting sheet may be disposed on the prism sheet and protects the prism sheet from the external impact.

The diffuse sheet, the prism sheet, and the protecting sheet may be each provided one by one and may also be used while overlapping each other by plural sheets. Further, in some cases, any one of the diffuse sheet, the prism sheet, and the protecting sheet may also be omitted.

According to the exemplary embodiment, the second side 230-2, the third side 230-3, and the fourth side 230-4 of the light guide plate 230 overlap the display area DA of the liquid crystal display panel 100 and a change in light characteristics may appear in the second side 230-2, the third side 230-3, and the fourth side 230-4 of the light guide plate 230, which may be visualized as a striped pattern. In particular, the change in light characteristics may appear as a bright striped pattern along the second side 230-2, the third side 230-3, and the fourth side 230-4 of the light guide plate 230. Hereinafter, a structure for preventing the striped pattern from being visualized will be described with reference to FIGS. 9 and 10.

Figure 9:
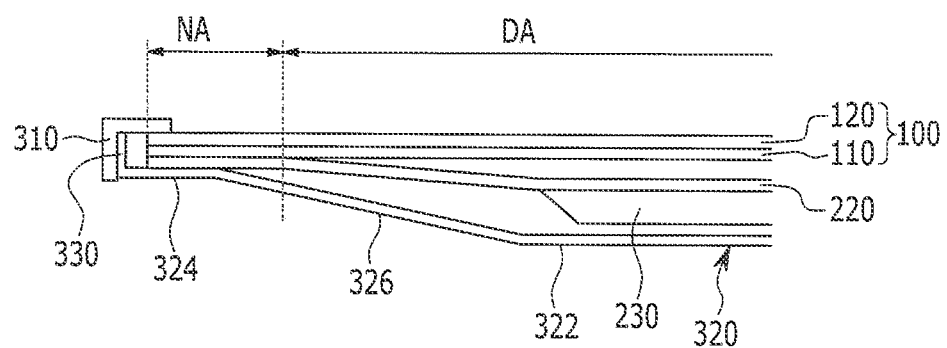
FIGS. 9 and 10 are cross-sectional views of the liquid crystal display device according to an exemplary embodiment.
Figure 10:
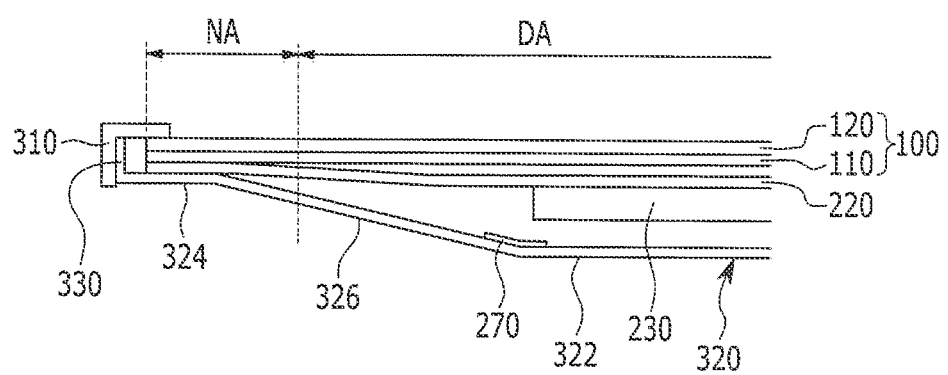

FIGS. 9 and 10 are cross-sectional views of the liquid crystal display device according to an exemplary embodiment. FIGS. 9 and 10 illustrate a circumference of any one of the second side to the fourth side of the light guide plate of the liquid crystal display device according to the exemplary embodiment.

As illustrated in FIG. 9, the second side 230-2, the third side 230-3, and the fourth side 230-4 of the light guide plate 230 may have a reverse taper shape. The side of the light guide plate 230 has an inclination to reduce the luminance of the edge of the light guide plate 230, thereby preventing the striped pattern from being visualized.

As illustrated in FIG. 10, a light blocking member 270 may be further positioned under the second side 230-2, the third side 230-3, and the fourth side 230-4 of the light guide plate 230. The light blocking member 270 may be attached to a portion at which the first bottom surface 322 and the inclined surface 326 of the lower cover 320 are connected to each other. The light blocking member 270 is a member which absorbs light and may lower the luminance of the edge of the light guide plate 230 to prevent the striped pattern from being visualized.

Next, a liquid crystal display device according to an exemplary embodiment will be described with reference to FIGS. 11 to 13.

Figure 11:
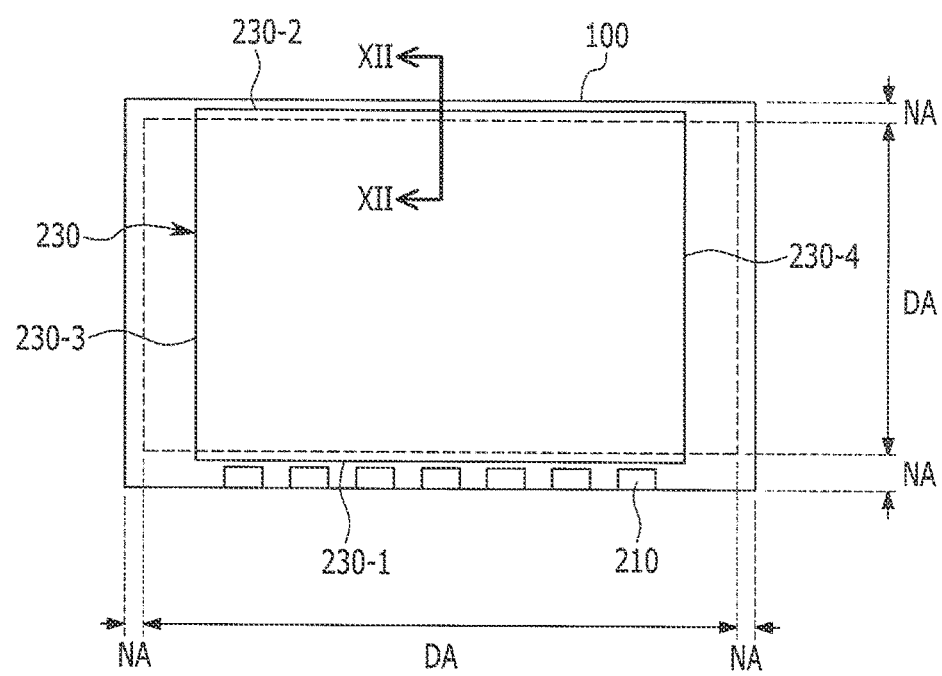
FIG. 11 is a plan view of a liquid crystal display device according to an exemplary embodiment.
Figure 12:
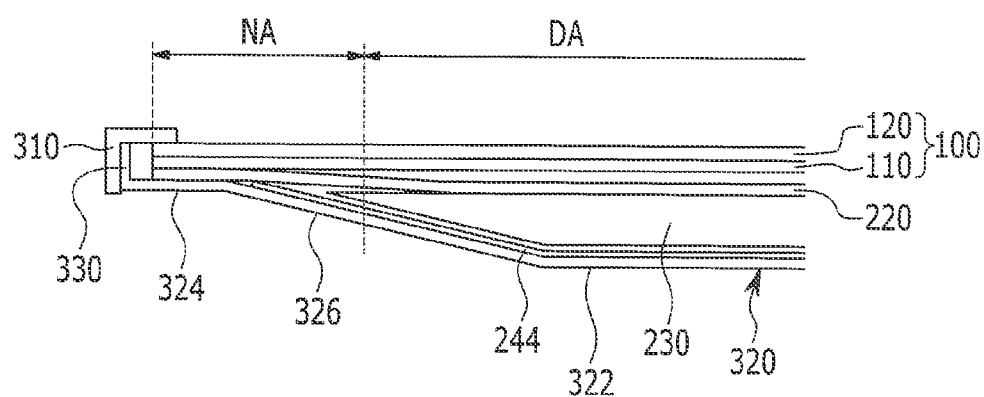
FIG. 12 is a cross-sectional view of the liquid crystal display device according to the exemplary embodiment taken along the line XII-XII of FIG. 11.
Figure 13:
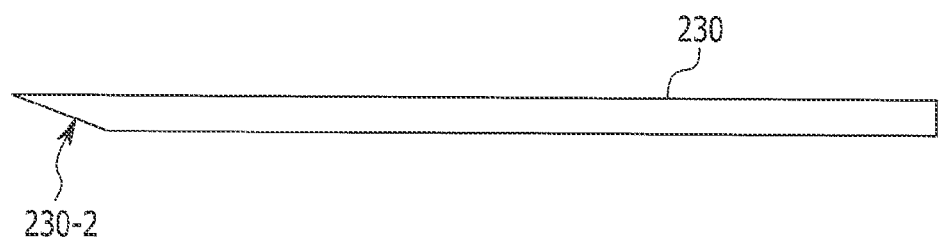
FIG. 13 is a cross-sectional view of a light guide plate of the liquid crystal display device according to the exemplary embodiment.

The liquid crystal display device according to the exemplary embodiment illustrated in FIGS. 11 to 13 is considerably the same as the display device according to the embodiment illustrated in FIGS. 1 to 4 and therefore the description thereof will be omitted. The exemplary embodiment is partially different from the foregoing exemplary embodiments in that the second side of the light guide plate overlaps the non-display area of the liquid crystal display panel, which will be described in more detail.

FIG. 11 is a plan view of a liquid crystal display device according to an exemplary embodiment. FIG. 12 is a cross-sectional view of the liquid crystal display device according to the exemplary embodiment taken along the line XII-XII of FIG. 11. FIG. 13 is a cross-sectional view of a light guide plate of the liquid crystal display device according to the exemplary embodiment. FIG. 13 is a cross-sectional view taken along a short side of the light guide plate.

Similar to the foregoing exemplary embodiments, the liquid crystal display device according to the exemplary embodiment includes the liquid crystal display panel 100, the light guide plate 230 positioned under the liquid crystal display panel 100, and the light source 210 positioned at one edge of the light guide plate 230.

The light guide plate 230 has a polygonal plane shape including the first side 230-1, the second side 230-2, the third side 230-3, and the fourth side 230-4 and a length of the first side 230-1 and the second side 230-2 is longer than that of the third side 230-3 and the fourth side 230-4.

The light source 210 is disposed to be adjacent to the first side 230-1 of the light guide plate 230. The first side 230-1 of the light guide plate 230 and the second side 230-2 facing the first side 230-1 overlap the non-display area NA of the liquid crystal display panel 100 and the third side 230-3 and the fourth side 230-4 overlap the display area DA of the liquid crystal display panel 100.

According to the foregoing exemplary embodiment, the second side 230-2 of the light guide plate 230 overlaps the display area DA of the liquid crystal display panel 100, but according to the exemplary embodiment, the second side 230-2 of the light guide plate 230 overlaps the non-display area NA of the liquid crystal display panel 100. That is, according to the exemplary embodiment, the second side 230-2 of the light guide plate 230 is formed to be more expanded than that of the foregoing exemplary embodiments.

The lower cover 320 includes a first bottom surface 322, a second bottom surface 324, an inclined surface 326 and a first side surface 328 which connects between the first bottom surface 322 and the second bottom surface 324, and a second side surface 330 enclosing the second bottom surface 324.

The inclined surface 326 of the lower cover 320 is positioned outside the third side 230-3 and the fourth side 230-4 of the light guide plate 230 and overlaps the second side 230-2 of the light guide plate 230. The second side 230-2 of the light guide plate 230 has an inclination. In this case, the inclination of the second side 230-2 of the light guide plate 230 is parallel with the inclination of the inclined surface 326 of the lower cover 320. At the portion which overlaps the inclined surface 326 of the lower cover 320, the light guide plate 230 has a gradually reduced thickness toward an edge. Referring to FIG. 13, the light guide plate 230 has a constant thickness at most of the area of the light guide plate 230 and has a reduced thickness at a portion adjacent to the second side 230-2 of the light guide plate 230.

In the liquid crystal display device according to the exemplary embodiment, the portion of the lower cover 320 which is adjacent to the third side 230-3 and the fourth side 230-4 of the light guide plate 230 and the portion which overlaps the second side 230-2 has the inclined surface 326, thereby reducing the thickness of the liquid crystal display device. Therefore, a liquid crystal display device of which the thickness of the edge is thin may be implemented.

The liquid crystal display device according to the exemplary embodiment further includes the first reflective sheet 240 which is positioned on the inclined surface 326 of the lower cover 320 which is adjacent to the third side 230-3 and the fourth side 230-4 of the light guide plate 230. Further, the liquid crystal display device according to the exemplary embodiment further includes a second reflective sheet 244 which is positioned between the light guide plate 230 and the lower cover 320. In particular, the second reflective sheet 244 is positioned on the inclined surface 326 which is positioned under the second side 230-2 of the light guide plate 230 and is positioned on the first bottom surface 322 of the lower cover 320.

The first reflective sheet 240 may be configured of a specular reflective sheet or may be configured of the diffuse reflective sheet on which the pattern is printed. The second reflective sheet 244 may be configured of the diffuse reflective sheet.

The shape of the third side 230-3 and the fourth side 230-4 of the light guide plate 230 and components therearound are formed to be similar to those of the foregoing exemplary embodiments. Further, the prism may be attached to the third side 230-3 and the fourth side 230-4 of the light guide plate 230.

Next, a liquid crystal display device according to an exemplary embodiment will be described with reference to FIGS. 14 to 17.

The liquid crystal display device according to the exemplary embodiment illustrated in FIGS. 14 to 17 is considerably the same as the display device according to the embodiment illustrated in FIGS. 11 to 13 and therefore the description thereof will be omitted. The exemplary embodiment is partially different from the foregoing exemplary embodiments in that the thickness of the light guide plate is gradually thinner from the first side toward the second side, which will be described in more detail.

Figure 14:
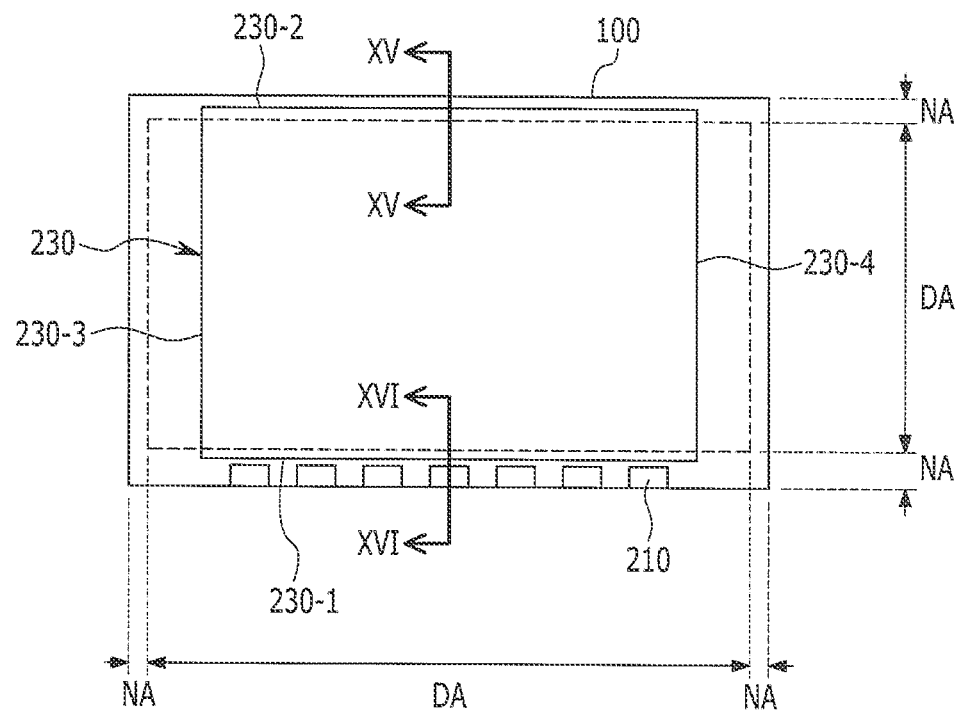
FIG. 14 is a plan view of a liquid crystal display device according to an exemplary embodiment.
Figure 15:
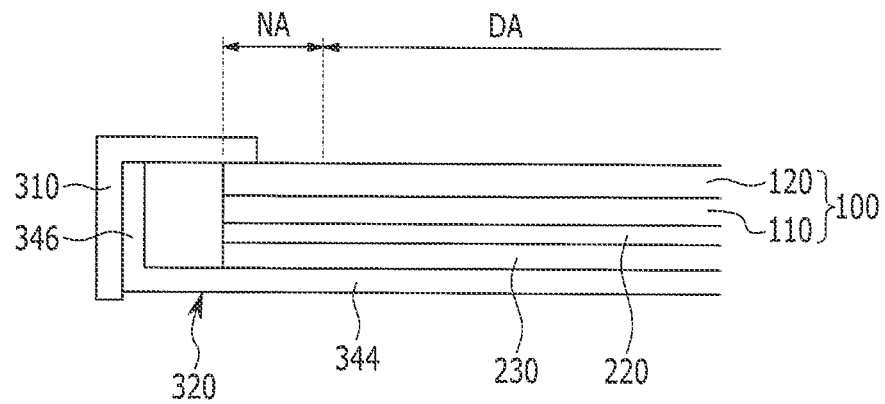
FIG. 15 is a cross-sectional view of the liquid crystal display device according to the exemplary embodiment taken along the line XV-XV of FIG. 14.
Figure 16:
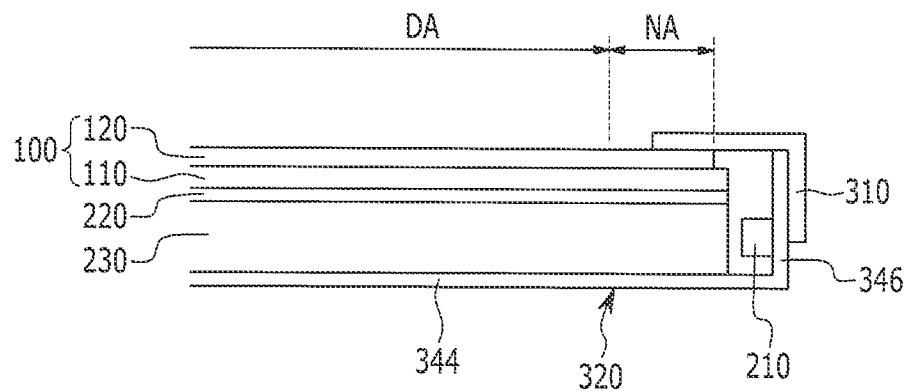
FIG. 16 is a cross-sectional view of the liquid crystal display device according to the exemplary embodiment taken along the line XVI-XVI of FIG. 14.
Figure 17:
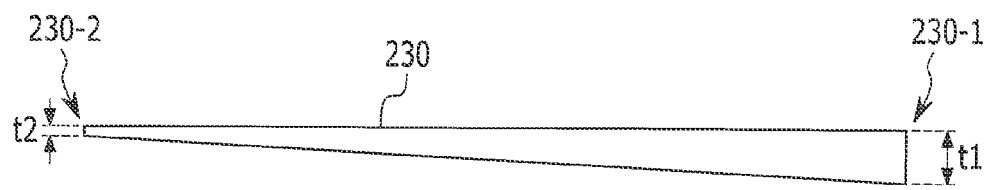
FIG. 17 is a cross-sectional view of a light guide plate of the liquid crystal display device according to the exemplary embodiment.

FIG. 14 is a plan view of a liquid crystal display device according to an exemplary embodiment, FIG. 15 is a cross-sectional view of the liquid crystal display device according to the exemplary embodiment taken along the line XV-XV of FIG. 14, FIG. 16 is a cross-sectional view of the liquid crystal display device according to the exemplary embodiment taken along the line XVI-XVI of FIG. 14, and FIG. 17 is a cross-sectional view of a light guide plate of the liquid crystal display device according to the exemplary embodiment. FIG. 17 is a cross-sectional view taken along a short side of the light guide plate.

Similar to the foregoing exemplary embodiments, the liquid crystal display device according to the exemplary embodiment includes the liquid crystal display panel 100, the light guide plate 230 positioned under the liquid crystal display panel 100, and the light source 210 positioned at one edge of the light guide plate 230.

The light guide plate 230 has a polygonal plane shape including the first side 230-1, the second side 230-2, the third side 230-3, and the fourth side 230-4 and a length of the first side 230-1 and the second side 230-2 is longer than that of the third side 230-3 and the fourth side 230-4.

The light source 210 is disposed to be adjacent to the first side 230-1 of the light guide plate 230. The first side 230-1 of the light guide plate 230 and the second side 230-2 facing the first side 230-1 overlap the non-display area NA of the liquid crystal display panel 100 and the third side 230-3 and the fourth side 230-4 overlap the display area DA of the liquid crystal display panel 100.

A thickness t2 of the second side 230-2 of the light guide plate 230 is different from a thickness t1 of the first side 230-1 of the light guide plate 230. The thickness t2 of the second side 230-2 of the light guide plate 230 is thinner than the thickness t1 of the first side 230-1 of the light guide plate 230. In this case, as illustrated in FIG. 17, the thickness of the light guide plate 230 is gradually thinner from the first side 230-1 toward the second side 230-2. According to the foregoing exemplary embodiments, the light guide plate 230 has a constant thickness in most region and has a form in which the thickness is reduced only in the portion adjacent to the second side 230-2, but according to the exemplary embodiment, the thickness of the light guide plate 230 is gradually changed from the first side 230-1 to the second side 230-2.

The lower cover 320 includes a bottom surface 344 and a side 346 which is connected to the bottom surface 344 to enclose the bottom surface 344.

The bottom surface 344 is positioned under the light guide plate 230 and the light guide plate 230 and the liquid crystal display panel 100 are received in the bottom surface 344. The bottom surface 344 has an inclination depending on the change in the thickness of the light guide plate 230.

The side 346 encloses the sides of the light guide plate 230 and the liquid crystal display panel 100. The side 346 also has a different height depending on the change in the thickness of the light guide plate 230. A height of the side 346 of the lower cover 320 which is adjacent to the second side 230-2 of the light guide plate 230 is lower than that of the side 346 of the lower cover 320 adjacent to the first side 230-1 of the light guide plate 230. The light source 210 is attached to the side 346 of the lower cover which is adjacent to the first side 230-1 of the light guide plate 230.

The lower cover 320 has an inclination depending on the change in the thickness of the light guide plate 230, and thus the thickness of the liquid crystal display device is also changed. That is, the thickness of the liquid crystal display device is reduced from one side of the liquid crystal display device in which the light source 210 is disposed toward the other side facing one side. Therefore, the liquid crystal display device of which the thickness of the edge is thin may be implemented.

The shape of the third side 230-3 and the fourth side 230-4 of the light guide plate 230 and components therearound may be formed to be similar to those of the foregoing exemplary embodiments.

Next, a liquid crystal display device according to an exemplary embodiment will be described with reference to FIGS. 18 and 19.

Figure 18:
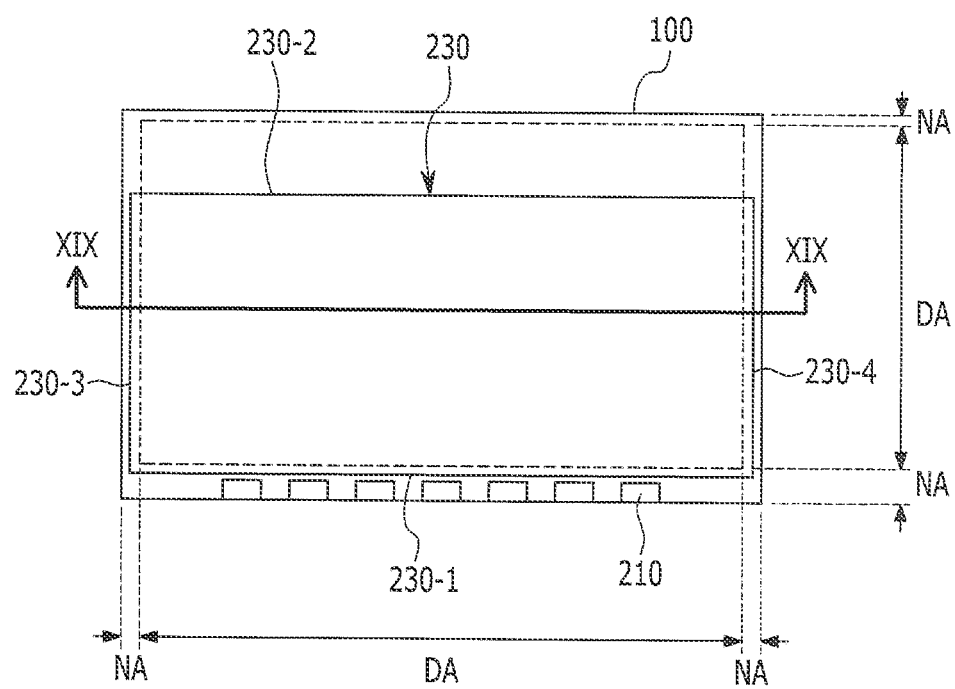
FIG. 18 is a plan view of a liquid crystal display device according to an exemplary embodiment.
Figure 19:
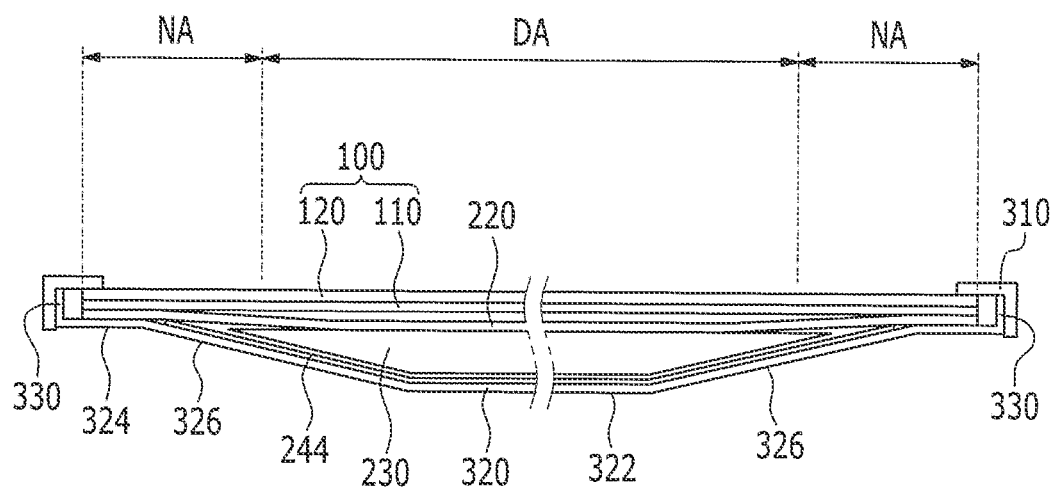
FIG. 19 is a cross-sectional view of the liquid crystal display device according to the exemplary embodiment taken along the line XIX-XIX of FIG. 18.

The liquid crystal display device according to the exemplary embodiment illustrated in FIGS. 18 and 19 is considerably the same as the display device according to the embodiment illustrated in FIGS. 1 to 4 and therefore the description thereof will be omitted. The exemplary embodiment is partially different from the foregoing exemplary embodiments in that the third side and the fourth side of the light guide plate overlap the non-display area of the liquid crystal display panel, which will be described in more detail.

FIG. 18 is a plan view of a liquid crystal display device according to an exemplary embodiment and FIG. 19 is a cross-sectional view of the liquid crystal display device according to the exemplary embodiment taken along the line XIX-XIX of FIG. 18.

Similar to the foregoing exemplary embodiments, the liquid crystal display device according to the exemplary embodiment includes the liquid crystal display panel 100, the light guide plate 230 positioned under the liquid crystal display panel 100, and the light source 210 positioned at one edge of the light guide plate 230.

The light guide plate 230 has a polygonal plane shape including the first side 230-1, the second side 230-2, the third side 230-3, and the fourth side 230-4 and a length of the first side 230-1 and the second side 230-2 is longer than that of the third side 230-3 and the fourth side 230-4.

The light source 210 is disposed to be adjacent to the first side 230-1 of the light guide plate 230. The second side 230-2 facing the first side 230-1 of the light guide plate 230 overlaps the display area DA of the liquid crystal display panel 100 and the first side 230-1, the third side 230-3, and the fourth side 230-4 of the light guide plate 230 overlap the non-display area NA of the liquid crystal display panel 100.

According to the foregoing exemplary embodiment, the third side 230-3 and the fourth side 230-4 of the light guide plate 230 overlap the display area DA of the liquid crystal display panel 100, but according to the exemplary embodiment, the third side 230-3 and the fourth side 230-4 of the light guide plate 230 overlap the non-display area NA of the liquid crystal display panel 100. That is, according to the exemplary embodiment, the third side 230-3 and the fourth side 230-4 of the light guide plate 230 are formed to be more expanded than that of the foregoing exemplary embodiments.

The lower cover 320 includes a first bottom surface 322, a second bottom surface 324, an inclined surface 326 which connects between the first bottom surface 322 and the second bottom surface 324, and a second side surface 330 enclosing the second bottom surface 324.

The inclined surface 326 of the lower cover 320 is positioned outside the second side 230-2 of the light guide plate 230 and overlaps the third side 230-3 and the fourth side 230-4 of the light guide plate 230. The third side 230-3 and the fourth side 230-4 of the light guide plate 230 have an inclination. In this case, the inclination of the third side 230-3 and the fourth side 230-4 of the light guide plate 230 is parallel with the inclination of the inclined surface 326 of the lower cover 320. At the portion which overlaps the inclined surface 326 of the lower cover 320, the light guide plate 230 has a gradually reduced thickness toward an edge. The light guide plate 230 has a constant thickness in most of the regions of the light guide plate 230 and the thickness thereof is reduced at the portion which is adjacent to the third side 230-3 and the fourth side 230-4 of the light guide plate 230.

In the liquid crystal display device according to the exemplary embodiment, the portion of the lower cover 320 which is adjacent to the second side 230-2 of the light guide plate 230 and the portion which overlaps the third side 230-3 and the fourth side 230-4 has the inclined surface 326, thereby reducing the thickness of the liquid crystal display device. Therefore, the liquid crystal display device of which the thickness of the edge is thin may be implemented.

The liquid crystal display device according to the exemplary embodiment further includes the first reflective sheet 240 which is positioned on the inclined surface 326 of the lower cover 320 which is adjacent to the second side 230-2 of the light guide plate 230. Further, the liquid crystal display device according to the exemplary embodiment further includes a second reflective sheet 244 which is positioned between the light guide plate 230 and the lower cover 320. In particular, the second reflective sheet 244 is positioned on the inclined surface 326 of the lower cover 320 which is positioned under the third side 230-3 and the fourth side 230-4 of the light guide plate 230 and is positioned on the first bottom surface 322 of the lower cover 320.

The first reflective sheet 240 may be configured of a specular reflective sheet or may be configured of the diffuse reflective sheet on which the pattern is printed. The second reflective sheet 244 may be configured of the diffuse reflective sheet.

The shape of the second side 230-2 of the light guide plate 230 and components therearound are formed to be similar to those of the foregoing exemplary embodiments. Further, the second side 230-2 of the light guide plate 230 may be attached with the prism 260.

Next, a liquid crystal display device according to an exemplary embodiment will be described with reference to FIGS. 20 and 21.

Figure 20:
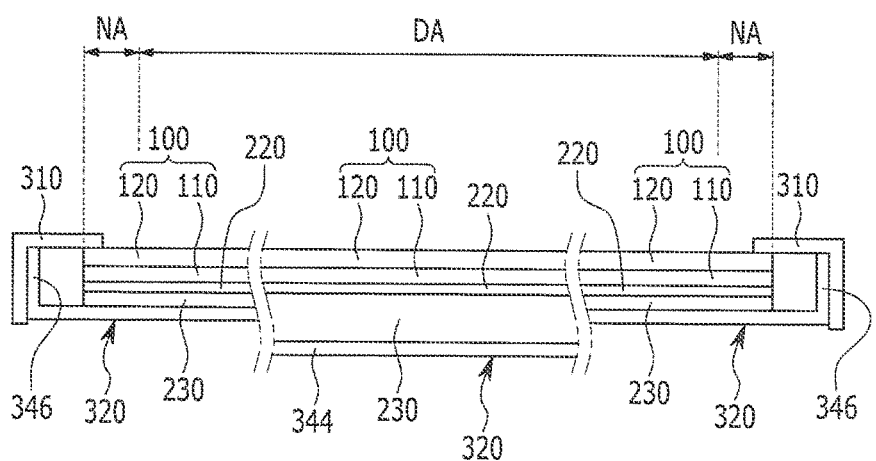
FIG. 20 is a cross-sectional view of a liquid crystal display device according to an exemplary embodiment.
Figure 21:
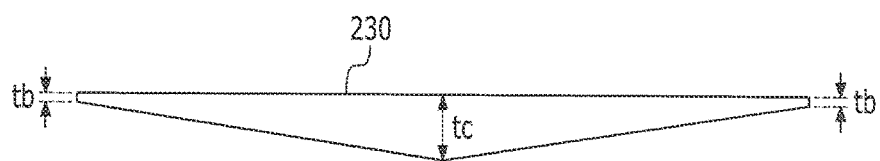
FIG. 21 is a cross-sectional view of a light guide plate of the liquid crystal display device according to the exemplary embodiment.

The liquid crystal display device according to the exemplary embodiment illustrated in FIGS. 20 and 21 is considerably the same as the display device according to the embodiment illustrated in FIGS. 18 and 19 and therefore the description thereof will be omitted. The exemplary embodiment is partially different from the foregoing exemplary embodiments in that the thickness of the light guide plate is gradually thinner from the center toward both sides, which will be described in more detail.

FIG. 20 is a cross-sectional view of a liquid crystal display device according to an exemplary embodiment and FIG. 21 is a cross-sectional view of a light guide plate of the liquid crystal display device according to the exemplary embodiment. FIG. 21 is a cross-sectional view taken along a long side of the light guide plate.

Similar to the foregoing exemplary embodiments, the liquid crystal display device according to the exemplary embodiment includes the liquid crystal display panel 100, the light guide plate 230 positioned under the liquid crystal display panel 100, and the light source 210 positioned at one edge of the light guide plate 230.

The light guide plate 230 has a polygonal plane shape including the first side 230-1, the second side 230-2 the third side 230-3, and the fourth side 230-4 and a length of the first side 230-1 and the second side 230-2 is longer than that of the third side 230-3 and the fourth side 230-4.

The light source 210 is disposed to be adjacent to the first side 230-1 of the light guide plate 230. The second side 230-2 facing the first side 230-1 of the light guide plate 230 overlaps the display area DA of the liquid crystal display panel 100 and the first side 230-1, the third side 230-3, and the fourth side 230-4 of the light guide plate 230 overlap the non-display area NA of the liquid crystal display panel 100.

A thickness tc of a center of the light guide plate 230 is different from a thickness tb of the third side 230-3 of the light guide plate 230 and the thickness tc of the center of the light guide plate 230 is different from a thickness tb of the fourth side 230-4 of the light guide plate 230. The thickness tb of the third side 230-3 and the fourth side 230-4 of the light guide plate 230 is thinner than the thickness tc of the center of the light guide plate 230. In this case, as illustrated in FIG. 21, the thickness of the light guide plate 230 is gradually thinner from the center toward the third side 230-2. Further, the thickness of the light guide plate 230 is gradually thinner from the center toward the fourth side 230-4.

The lower cover 320 includes a bottom surface 344 and a side 346 which is connected to the bottom surface 344 to enclose the bottom surface 344.

The bottom surface 344 is positioned under the light guide plate 230 and the light guide plate 230 and the liquid crystal display panel 100 are received in the bottom surface 344. The bottom surface 344 has an inclination depending on the change in the thickness of the light guide plate 230.

The side 346 encloses the sides of the light guide plate 230 and the liquid crystal display panel 100. The light source 210 is attached to the side 346 of the lower cover which is adjacent to the first side 230-1 of the light guide plate 230.

The lower cover 320 has an inclination depending on the change in the thickness of the light guide plate 230, and thus the thickness of the liquid crystal display device is also changed. That is, the thickness of the liquid crystal display device is reduced from the center of the liquid crystal display toward both edges. Therefore, the liquid crystal display device of which the thickness of the edge is thin may be implemented.

The shape of the second side 230-2 of the light guide plate 230 and components therearound are formed to be similar to those of the foregoing exemplary embodiments.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of symbols>

| | |
|---|---|
| 100: Liquid crystal display panel | 110: First substrate |
| 120: Second substrate | 210: Light source |
| 220: Optical sheet | 230: Light guide plate |
| 230-1: First side of light guide plate | 230-2: Second side of light guide plate |
| 230-3: Third side of light guide plate | 230-4: Fourth side of light guide plate |
| 240: First reflective sheet | 242: Pattern |
| 244: Second reflective sheet | 260: Prism |
| 270: Light blocking member | 310: Upper cover |
| 320: Lower cover | |
| 322: First bottom surface of lower cover | |
| 324: Second bottom surface of lower cover | |
| 326: Inclined surface of lower cover | |
| 328: First side surface of lower cover | 330: Second side surface of lower cover |
| 344: Bottom surface of lower cover | 346: Side of lower cover |

What is claimed is:

1. A liquid crystal display device, comprising:
   a liquid crystal display panel including a display area and a non-display area enclosing the display area;
   a light guide plate disposed under the liquid crystal display panel and having a polygonal plane shape including a first side, a second side, a third side, and a fourth side;
   a light source adjacent to the first side of the light guide plate; and
   a lower cover accommodating the liquid crystal display panel, the light guide plate, and the light source,
   wherein at least one of the second side, the third side, and the fourth side of the light guide plate overlaps the display area,
   wherein a width of the light guide plate is narrower than a width of the liquid crystal display panel,
   wherein the light guide plate extends continuously under the liquid crystal display panel,
   wherein at least a portion of the display area of the liquid crystal display panel does not overlap the light guide plate,
   wherein the lower cover includes an inclined portion, the inclined portion overlapping the liquid crystal display panel and not overlapping the light guide plate,
   wherein the liquid crystal display panel has a first surface facing the inclined portion of the lower cover and a second surface opposite the first surface of the liquid crystal display panel, and wherein the inclined portion of the lower cover has a first surface facing the liquid crystal display panel and a second surface opposite the first surface of the inclined portion, and
   wherein the inclined portion includes a first end closer to the light guide plate and overlapping the display area and a second end closer to an edge of the liquid crystal display panel and overlapping the non-display area, and wherein a distance between the second surface of the inclined portion and the second surface of the liquid crystal display panel gradually decreases from the first end to the second end of the inclined portion.

2. The liquid crystal display device of claim 1, wherein:
   the first side of the light guide plate overlaps the non-display area, and
   the second side, the third side, and the fourth side of the light guide plate overlap the display area.

3. The liquid crystal display device of claim 2, wherein:
   the lower cover further includes:
   a first bottom portion;

a second bottom portion enclosing the first bottom portion and having a depth shallower than that of the first bottom portion;

the inclined portion and a first side portion connecting between the first bottom portion and the second bottom portion; and a second side portion connected to the second bottom portion to enclose the second bottom portion, the inclined portion is positioned outside the second side, the third side, and the fourth side of the light guide plate, and the first side portion of the lower cover is positioned outside the first side of the light guide plate.

4. The liquid crystal display device of claim 3, wherein: the light guide plate has a rectangular shape and a length of the first side and the second side is longer than that of the third side and the fourth side.

5. The liquid crystal display device of claim 3, further comprising:
a first reflective sheet positioned on the inclined portion.

6. The liquid crystal display device of claim 5, wherein: the first reflective sheet is configured of a specular reflective sheet.

7. The liquid crystal display device of claim 5, wherein: the first reflective sheet is configured of a diffuse reflective sheet on which a pattern is printed.

8. The liquid crystal display device of claim 7, wherein: as the pattern is farther away from the light guide plate, a size of the pattern is increased.

9. The liquid crystal display device of claim 3, further comprising:
a prism attached to side surfaces of the second side, the third side, and the fourth side of the light guide plate.

10. The liquid crystal display device of claim 3, wherein: the side surfaces of the second side, the third side, and the fourth side of the light guide plate have a reverse taper shape.

11. The liquid crystal display device of claim 3, further comprising:
a light blocking member positioned under the second side, the third side, and the fourth side of the light guide plate.

12. The liquid crystal display device of claim 11, wherein: the light blocking member is attached to a portion of the lower cover at which the first bottom portion and the inclined portion are connected.

13. The liquid crystal display device of claim 3, wherein: the light source is attached to the first side portion of the lower cover.

14. The liquid crystal display device of claim 13, wherein: a light emitting direction of the light source directs to the first side of the light guide plate.

15. The liquid crystal display device of claim 1, wherein: the first side of the light guide plate and the second side facing the first side overlap the non-display area, and the third side and the fourth side of the light guide plate overlap the display area.

16. The liquid crystal display device of claim 15, wherein: the lower cover further includes:

a first bottom portion;

a second bottom portion enclosing the first bottom portion and having a depth shallower than that of the first bottom portion;

the inclined portion and a first side portion connecting the first bottom portion to the second bottom portion; and a second side portion connected to the second bottom portion to enclose the second bottom portion, the inclined portion overlaps the second side of the light guide plate and is positioned outside the third side and the fourth side of the light guide plate, and the first side portion of the lower cover is positioned outside the first side of the light guide plate.

17. The liquid crystal display device of claim 16, wherein: a side surface of the second side of the light guide plate has an inclination.

18. The liquid crystal display device of claim 17, wherein: the inclination of the side surface of the second side of the light guide plate is parallel with an inclination of the inclined portion of the lower cover.

19. The liquid crystal display device of claim 17, further comprising:
a first reflective sheet positioned on the inclined portion which is adjacent to the third side and the fourth side of the light guide plate; and a second reflective sheet positioned between the light guide plate and the lower cover.

20. The liquid crystal display device of claim 19, wherein: the first reflective sheet is configured of a specular reflective sheet or a diffuse reflective sheet on which a pattern is printed.

21. The liquid crystal display device of claim 19, wherein: the first reflective sheet is configured of a diffuse reflective sheet.

22. The liquid crystal display device of claim 17, further comprising:
a prism attached to side surfaces of the third side and the fourth side of the light guide plate.

23. The liquid crystal display device of claim 15, wherein: the thickness of the light guide plate is gradually thinner from the first side toward the second side.

24. The liquid crystal display device of claim 1, wherein: the second side facing the first side of the light guide plate overlaps the display area, and the first side, the third side, and the fourth side of the light guide plate overlap the non-display area.

25. The liquid crystal display device of claim 24, wherein: the lower cover further includes:

a first bottom portion;

a second bottom portion enclosing the first bottom portion and having a depth shallower than that of the first bottom portion;

the inclined portion and a first side portion connecting between the first bottom portion and the second bottom portion; and a second side portion connected to the second bottom portion to enclose the second bottom portion, the inclined portion overlaps the third side and the fourth side of the light guide plate and is positioned outside the second side, and the first side portion of the lower cover is positioned outside the first side of the light guide plate.

26. The liquid crystal display device of claim 25, wherein: side surfaces of the third side and the fourth side of the light guide plate have an inclination.

27. The liquid crystal display device of claim 26, wherein: the inclination of the side surfaces of the third side and the fourth side of the light guide plate is parallel with an inclination of the inclined portion of the lower cover.

28. The liquid crystal display device of claim 26, further comprising:
a first reflective sheet positioned on the inclined portion which is adjacent to the second side of the light guide plate; and a second reflective sheet positioned between the light guide plate and the lower cover.

29. The liquid crystal display device of claim 28, wherein:
the first reflective sheet is configured of a specular reflective sheet or a diffuse reflective sheet on which a pattern is printed.

30. The liquid crystal display device of claim 28, wherein:
the second reflective sheet is configured of a diffuse reflective sheet.

31. The liquid crystal display device of claim 26, further comprising:
a prism attached to a side surface of the second side of the light guide plate.

32. The liquid crystal display device of claim 24, wherein:
the thickness of the light guide plate is gradually thinner from a center toward the third side and the fourth side.

* * * * *